(12) United States Patent
Baur et al.

(10) Patent No.: US 9,470,164 B2
(45) Date of Patent: Oct. 18, 2016

(54) PROCESS AND SYSTEM FOR THE RAPID AND SAFE ACTIVATION OF FUEL PUMPS

(71) Applicant: Bayerische Motoren Werke Aktiengesellschaft, Munich (DE)

(72) Inventors: Richard Baur, Pfaffenhofen (DE); Marcus Weidner, Weilheim (DE); Simon Schilling, Munich (DE); Klaus Achatz, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 169 days.

(21) Appl. No.: 14/099,362

(22) Filed: Dec. 6, 2013

(65) Prior Publication Data

US 2014/0093400 A1  Apr. 3, 2014

Related U.S. Application Data (63) Continuation of application No. PCT/EP2012/060349, filed on Jun. 1, 2012.

(30) Foreign Application Priority Data

Jun. 8, 2011 (DE) .................. 10 2011 077 192

(51) Int. Cl.
- *F02D 41/02* (2006.01)
- *B60K 28/14* (2006.01)

(Continued)

(52) U.S. Cl.
CPC ............ *F02D 41/021* (2013.01); *B60K 28/14* (2013.01); *F02D 29/02* (2013.01); *F02D 33/006* (2013.01); *F02D 41/22* (2013.01); *F02D 41/3082* (2013.01); *F02M 63/022* (2013.01)

(58) Field of Classification Search
CPC .......................... B60K 28/14; F02D 41/3082
See application file for complete search history.

(56) References Cited

U.S. PATENT DOCUMENTS

| | | |
|---|---|---|
| 3,854,053 A | 12/1974 | Garcea et al. |
| 5,441,026 A | 8/1995 | Akimoto |

(Continued)

FOREIGN PATENT DOCUMENTS

| | | |
|---|---|---|
| DE | 2261954 A1 | 7/1973 |
| DE | 3840912 A1 | 6/1989 |

(Continued)

OTHER PUBLICATIONS

German Search Report with partial English translation thereof dated Jan. 11, 2012 {Ten (10) pages}.

(Continued)

*Primary Examiner* — Mussa A Shaawat
*Assistant Examiner* — Kyung Kim
(74) *Attorney, Agent, or Firm* — Crowell & Moring LLP (57) ABSTRACT

A process is provided for the rapid and safe activation of a fuel pump, having a definable fallback level for a delivery volume of the fuel pump. The process recognizes a possible crash situation and, defines the fallback level as a first delivery volume value which is assigned to a closing position of the fuel pump in response to the recognized possible crash situation. A control system includes a crash recognition device and an electronic fuel pump with the definable fallback level, in which case the crash recognition device is connected with respect to communication with the electronic fuel pump, and the crash recognition device is constructed for implementing the process.

17 Claims, 5 Drawing Sheets

(51) Int. Cl.
*F02D 29/02* (2006.01)
*F02D 33/00* (2006.01)
*F02D 41/22* (2006.01)
*F02D 41/30* (2006.01)
*F02M 63/02* (2006.01)

(56) References Cited

U.S. PATENT DOCUMENTS

| | | | |
|---|---|---|---|
| 5,797,111 | A | 8/1998 | Halasz et al. |
| 7,690,458 | B2 | 4/2010 | Ueda |
| 2005/0236213 | A1 | 10/2005 | Hosoya |
| 2007/0203615 | A1 | 8/2007 | Tustanowski et al. |
| 2007/0240684 | A1 | 10/2007 | Tippy et al. |
| 2010/0121525 | A1* | 5/2010 | Le .................. B60K 28/14 |
| | | | 701/36 |

FOREIGN PATENT DOCUMENTS

| | | |
|---|---|---|
| DE | 4440700 A1 | 6/1995 |
| DE | 19841659 A1 | 3/2000 |
| DE | 602005001885 T2 | 12/2007 |
| DE | 11 2004 000 890 B4 | 5/2008 |
| DE | 10 2008 040 038 A1 | 6/2009 |
| KR | 0186699 B1 | 12/1998 |
| KR | 10-2007-0027950 A | 3/2007 |
| WO | WO 2007/023166 A1 | 3/2007 |

OTHER PUBLICATIONS

International Search Report with English translation thereof dated Sep. 14, 2012 {Eight (8) pages}.

* cited by examiner

PROCESS AND SYSTEM FOR THE RAPID AND SAFE ACTIVATION OF FUEL PUMPS

CROSS REFERENCE TO RELATED APPLICATIONS

This application is a continuation of PCT International Application No. PCT/EP2012/060349, filed Jun. 1, 2012, which claims priority under 35 U.S.C. §119 from German Patent Application No. 102011077192.1, filed Jun. 8, 2011, the entire disclosures of which are herein expressly incorporated by reference.

BACKGROUND AND SUMMARY OF THE INVENTION

The invention relates to a process and a system for rapidly and safely activating fuel pumps. In particular, the invention relates to a process and a system for rapidly and safely activating electronic fuel pumps for a motor vehicle in the event of a vehicle crash.

Fuel pumps are used in injection systems of internal-combustion engines and have the purpose of delivering fuel intended for combustion from a tank for supply to the internal-combustion engine by way of a pressurized supply system.

Electronic fuel pumps, in particular, are used in current motor vehicles. They are controlled electronically and, according to certain requirements, provide the currently necessary amount of fuel for the combustion. To that end, the fuel pumps receive signals or information, for example, by way of the CAN bus of the vehicle, concerning the current fuel demand, so that the corresponding controlling of the fuel pump can take place for the delivery of the current amount of fuel. Usually, the signal or the information are provided by the vehicle drive or its control device and are forwarded to the fuel pump.

In the event of an accident of the vehicle, particularly in the event of a crash, there is a danger that fuel may escape from the pressurized supply system as a result of damage or leaks and may be ignited by the effect of heat. In order to reduce a resulting acute fire hazard, it is known to switch off the electronic fuel pump in the event of a crash by way of a crash signal of a crash recognition system in order to stop the fuel delivery. Such a switching-off takes place, for example, by way of an engine control device, which can activate a fuel pump relay in response to a corresponding crash signal.

Various systems for switching off a fuel pump are known from the prior art. Thus, German reference DE 198 41 659 A1 describes a process for controlling a fuel pump for a motor vehicle, wherein the fuel pump can be switched off as a result of a crash signal by the engine control device because of an accident.

From reference DE 38 40 912, a fuel supply system for a motor vehicle is known which, among other things, describes a safety device for the independent deactivating of a fuel pump in the event of a crash, the safety device utilizing crash-caused forces for this purpose.

However, the known systems for switching off the fuel pump have in common that a switch-off signal is not generated until after a recognition of an actual physical crash event and, for switching off the fuel pump, is transmitted to the latter.

The recognition of an actual crash situation takes place corresponding to generally known processes and systems. However, since this recognition is no simple binary decision but rather first requires evaluations of building-up stresses and decelerations, valuable time goes by until a decision can be made whether or not an actual crash situation is present. When a positive result is determined, a triggering of certain safety systems, such as airbags, takes place.

The known systems therefore have the disadvantage that a time period from the start of the crash, thus the actual first contact of the vehicle with an obstacle, to the sending of the switch-off signals, based on the principle, lasts relatively long. An empirical value for this time period used as an example is approximately 80 ms. In addition, further time delays until the reception of the switch-off signals in the electronic fuel pump take place, among other reasons, because of system-related latency periods. In this respect, an empirical value also only used as an example is an additional time period of approximately 100 ms, so that the total duration is approximately 180 ms in order to recognize a crash and to forward a switch-off signal based on this crash or a signal generated by it to the electronic fuel pump.

Since a crash of a vehicle will result in considerable destruction within a very short time period, for example, 200 ms, it cannot be excluded in the case of a crash that the fuel lines are damaged and become leaky, so that fuel may already escape before the fuel pump is switched off. In addition, it cannot be excluded that, as a result of the crash, particularly because of the resulting destruction and penetrating objects or components (intrusions), a communication-related connection to the fuel pump will be interrupted so that the switch-off signal sent to the fuel pump can no longer reach the latter and a switch-off therefore does not take place.

This applies particularly to a lateral crash because, in this case, considerable destructions and intrusions may take place within clearly shorter time periods, which may lead to the described damage of the fuel line as well to an interruption of an activation of the fuel pump. If this occurs, it is neither possible to transmit a switch-off signal nor any other signal to the fuel pump, such as a signal for reducing the current fuel delivery volume or for a complete switch-off. This means that, in the case of an actual crash, a fuel pump—if still operational—will continue to deliver fuel, so that this fuel is released, and the risk of fire is increased or a fire is facilitated. In the worst case, this means that the fuel tank of the vehicle is pumped dry.

Although electronic fuel pumps have a fallback level, which indicates a defined delivery volume value for a case in which a control signal for providing information on the fuel volume to be delivered at the current time fails to materialize, this value is normally defined for a delivery volume value that corresponds to an opening position of the fuel pump. The reason is that a switching-off of the fuel pump, in the case of a (briefly) absent signal, for example, because of a defect in the signal-generating or signal-transmitting components, is to be prevented. Although in this manner a failure probability can be lowered in the case of this disturbance, simultaneously, fuel continues to be delivered in a crash situation—as described above. In contrast, although an opposite definition of the delivery volume value defined as the fallback level corresponding to a closing position would prevent the delivery operation in a crash situation, in the case of absent signals, it would lead to an involuntary stop of the vehicle because of the unintended switching-off of the fuel pump.

A conflict therefore exists in the state of the art when defining the fallback level between failure safety with a fuel delivery volume that is as high as possible under the aspect of a reliability of the vehicle, on the one hand, and safety in the case of a crash with a delivery volume that is as low as possible, on the other hand. Contradictory demands therefore exist so that, depending on the configuration, there is either a safety risk or an availability risk.

It is therefore an object of the invention to overcome or reduce the above-mentioned disadvantages and particularly provide an activation of a fuel pump which fulfils both aspects—thus, a high availability, on the one hand, as well as the best-possible safety in the event of an accident, on the other hand.

According to the invention, this object is achieved by providing a process for the rapid and safe activating of a fuel pump, as well as a control system for such an electronic fuel pump, having a definable fallback level for a delivery volume of the fuel pump. The process includes the acts of: recognizing a possible crash situation; and defining the fallback level as a first delivery volume value which is assigned to a closing position of the fuel pump in response to the recognized possible crash situation.

The described process therefore makes it possible to define a fallback level of a fuel pump, particularly of an electronic fuel pump, not globally ahead of time as an unchangeable value but to carry out a suitable definition as a function of the requirements. A demand exists here in the case of a possible crash of the vehicle.

The term "possible" crash situation should be understood such that either a situation exists in which a crash has not yet actually taken place but is only threatening, or, although the crash has already taken place or started, it has not yet been recognized as an actual crash by a known crash recognition. In other words, it is recognized in this step that there is the possibility that a crash is already occurring or could be directly imminent. Corresponding signs for the recognition of the possible crash will be described in detail in the following. The recognition of the described "possible" crash is therefore followed by the step of recognizing the actual crash (if there is one).

In contrast to the known recognition of an actual crash, the described recognition of a possible crash situation is provided such that, because of increased loads and decelerations, the crash recognition device already concludes before the recognition of an actual crash that an actual crash will be imminent. For reasons of a vehicle availability and reliability that should be as optimal as possible, however, in this case, no switching-off of the fuel pump should take place yet as long as no actual crash situation has been determined.

When such a possible crash is therefore recognized by a crash recognition device according to the invention, the above-mentioned definition of the fallback level of the fuel pump takes place in preparation for the subsequent actual crash. Within the scope of this definition step, the fuel pump receives a corresponding signal or information from the crash recognition device so that a storing of the corresponding first delivery volume value can be carried out. This delivery volume value is either stored directly by the crash recognition device in the fuel pump by way of the signal or the fuel pump itself carries out the definition of the delivery volume value in response to the information of the crash recognition device.

The first delivery volume value is assigned to a closing position of the fuel pump, so that, when the value is applied, the fuel pump is moved into its closing position and is thereby closed. This first delivery volume value can therefore describe, for example, a delivery volume value of 0 liter/min or an opening degree or delivery degree of the fuel pump of 0%. When the first delivery volume value is applied, the flow rate of the fuel pump is therefore reduced completely, so that, in this case, no more fuel is pumped by the fuel pump. The fuel pump is therefore preferably switched off.

Naturally, the first delivery volume value may also be defined to have a value greater than 0 liter/min if that should be desirable, so that, for example, a reduced flow rate will be stored by a corresponding value.

The step of defining the fallback level therefore results only in a storing of the first delivery volume value, but has no direct influence on the actual delivery volume of the fuel pump in a normal operation of the vehicle. As long as the fuel pump receives signals or information concerning a current demand of the fuel volume to be delivered, the fallback level will not be taken into account. The described step of defining the fallback level, in particular, does not yet cause an immediate reduction of the current delivery volume. The fuel pump is therefore only changed to a ready state for a later switch-off. The electronic fuel pump will recognize a defective operating state only in the absence of information or in the absence of a communication and will fall back to the fallback level or the first delivery volume value stored there, which will then lead to stoppage of the corresponding delivery volume.

The process therefore comprises the following steps:
(a) recognition of an actual crash situation, and
(b) use of the delivery volume value defined as the fallback level for closing the fuel pump in response to the actually recognized crash situation.

The fuel pump therefore recognizes a defective operating state and is thereby caused to fall back to a delivery volume value defined at the fallback level. Therefore, if, as a result of a recognized possible crash situation, the first delivery volume value was stored for closing the fuel pump, because of the application of this value, the delivery operation of the fuel pump will be stopped.

If, in contrast, no possible crash situation is recognized beforehand, the first delivery volume value will not be stored at the fallback level but preferably a further delivery volume value which corresponds to an opening position of the fuel pump, in order to prevent an unintended switching-off of the fuel pump. This may be the case, for example, in the event of a sudden failure of a communication of the fuel pump because of a technical defect. The further delivery volume value will then be used for ensuring a further operation of the fuel pump. For this purpose, the further delivery volume value will preferably be defined to be greater than 0 liter/min.

Since the step of the definition of the fallback level according to the invention precedes the step of recognizing an actual crash situation, as a result of this "preconditioning" of the fallback level, the time period between an actual crash start (thus, the first contact) and the known sending of information for the crash switch-off does not go by unutilized. Particularly by using the described process, a possibility is provided for a reliable switching-off in the event that a communication connection for activating the fuel pump breaks off as a result of effects of the crash.

According to a further embodiment of the invention, the process further comprises the following steps:
recognizing an absence of a crash situation after the expiration of a defined time interval, and
defining the fallback level to be a second delivery volume value which is assigned to an opening position of the fuel pump.

Thus, when a possible crash situation was recognized and the fallback level was correspondingly defined in preparation for an actual crash situation, it may happen that no actual crash will follow. The "expected" crash will be "absent". This may be so, for example, in the case of a "false alarm", thus an incorrectly recognized possible crash situation or a crash situation that was averted after the recognition. In this case, a resetting of the stored delivery volume value of the fallback level has to take place in order to prevent an unintended switching-off of the fuel pump. The fallback level is therefore redefined and the second delivery volume value is stored. The latter replaces the first delivery volume value and is assigned to an opening position so that, when it is used, the fuel pump will provide a corresponding delivery volume of fuel. For this purpose, the second delivery volume value is preferably assigned to a delivery volume greater than 0 liter/min.

If now there is a case in which the fuel pump loses its communication connection and receives no further information or signals, it will use the fallback level and the second delivery volume value so that a sufficient amount of fuel will be made available for the further operation of the internal-combustion engine and a failure of the vehicle will thereby be prevented.

Such a resetting of the first delivery volume value to the second delivery volume value can automatically take place after the expiration of a defined time interval. In other words, when a possible crash situation is recognized and the fallback level is defined to the first delivery volume value, thus the fuel pump is changed to a ready state, a time recording will be started. If no confirmation of a crash takes place within a defined time interval by the recognition of an actual crash, the recognition of the possible crash situation may be classified as a false alarm and the fallback level may be defined to the second delivery volume value. This second delivery volume value represents, for example, a normal operating state of the vehicle. Depending on the requirements, the defined time interval may be selected such that that it can be ensured that a crash situation has been overcome; it preferably amounts to 3 to 20 seconds, preferably not more than 5 to 10 seconds.

According to another embodiment, the process, in addition, comprises the following steps:
recognizing an absence of a crash situation by use of evaluating sensor data, and
defining the fallback level to a second delivery volume value which is assigned to an opening position of the fuel pump.

Corresponding to the above representation, an absent crash situation, i.e. the absence of an expected crash or a false alarm, is therefore recognized. In contrast to the preceding embodiment, the latter is not determined on the basis of an eventless expiration of a time interval but by the acquisition and evaluation of sensor data, which suggest a normal operating state of the vehicle. As described above, subsequently, a defining of the fallback level also takes place to a second delivery volume level, which is assigned to a normal operating state of the vehicle and defines a certain delivery volume of the fuel pump.

Naturally, the two embodiments can be combined with one another so that, the expiration of a time interval as well as the evaluation of sensor data can be used for the step of defining the fallback level to the second delivery volume value.

A corresponding evaluation of sensor data, which can be used as indicators for a normal operating state of the vehicle, includes, for example, a user-controlled acceleration of the vehicle, a gear change or actuations of vehicle functions which typically could not or would not take place in the event of an actual crash.

The above-mentioned step of recognizing a possible crash situation may preferably include at least one of the following steps:
acquiring sensor data,
evaluating the acquired sensor data,
comparing the acquired or evaluated sensor data with predefined threshold values,
computing a probability of a possible crash situation by use of the acquired or evaluated sensor data, and/or
making a decision about the presence of a possible crash situation.

The step of acquiring sensor data for the recognition of a possible crash situation can preferably include a taking into account of sensors for monitoring the surroundings of the vehicle. Various systems are known for this purpose, such as cameras, proximity radar or distance sensors. These permit a recognition of potential collision objects already before an actual contact with the vehicle. If, for example, the determined distance falls below a predefined threshold value, a possible crash situation is recognized without an actual crash already having occurred. A corresponding definition of the fallback level can therefore already be carried out in a preventive manner.

Furthermore, braking or stability sensors can be used, which register unusual measured values, for example, high deceleration values in the case of a hard braking of the vehicle, or acceleration values, preferably a lateral and vertical acceleration of the vehicle. For example, an activation of the ABS or ESP or of other driver assistance systems can also be taken into account.

Likewise, possible crash situations can be determined from information provided by other vehicles concerning the environment or an infrastructure, thus, so-called "Car2Car" or "Car2Infrastructure" systems. These permit, for example, a particularly anticipatory recognition of a possible crash situation.

Generally, every sensor can therefore be used whose measured data can point to a possible accident danger, so that the described process can be carried out even before a first contact of the vehicle within the scope of a collision or a crash. This naturally applies not only to an acquisition before but also during the crash, preferably immediately after a first contact of the vehicle, until the recognition of the actual crash by the known systems.

Naturally, the acquired sensor data can be additionally processed within the scope of an optional evaluation step and can be analyzed corresponding to the requirements, in order to achieve the best-possible results for a recognition that is as precise as possible.

Within that scope, the sensor data, either the acquired and/or the already evaluated sensor data, can be compared with predefined threshold values, in order to recognize in this manner a deviation from a normal operating state of the vehicle or dangerous situations (for example, a rollover or a full braking).

Furthermore, a probability of a possible crash situation can be computed. For this purpose, any suitable linking of the different sensor data of a vehicle is contemplated. One example is the determination of a distance from a recognized obstacle as well as the simultaneous determination of a speed relative thereto. If this speed is comparatively high in view of the insufficient distance, or a threatening collision can possibly no longer be averted, a high probability of a threatening collision is assumed. By way of the probability consideration, signals of the sensors can therefore be used, and can be used and evaluated with respect to a potential collision danger, i.e. for recognizing a possible crash situation.

Within the scope of the decision step, the data and/or the computed probabilities can be used for a final decision of whether or not a possible crash situation was recognized.

Furthermore, a control system is provided for an electronic fuel pump, having a crash recognition device, and an electronic fuel pump with a definable fallback level. The crash recognition device is connected with the electronic fuel pump relative to communication, and the crash recognition device is designed for implementing the described process according to the invention.

Here, the crash recognition device preferably takes over the steps of recognizing the possible crash situation and provides corresponding signals. For this purpose, the crash recognition device has correspondingly designed devices. As described above, a definition of the fallback level of the fuel pump can be implemented by the fuel pump itself or also by the crash recognition device.

According to an embodiment of the control system, the crash recognition device and the electronic fuel pump are directly and/or indirectly connected with one another with respect to communication. The indirect communication of the crash recognition device with the fuel pump can, for example, take place by way of a vehicle drive, so that the crash recognition device can utilize an existing communication connection between the vehicle drive and the electronic fuel pump, for example, the CAN bus, for the transmission of its signals and information. The control system is preferably coordinated such that a transmission speed is sufficiently high in order to make the signals of the crash recognition device available before a possible interruption of the communication connection to the fuel pump.

As an alternative or in addition, a direct communication-related connection can be provided between the crash recognition device and the fuel pump (a so-called point-to-point connection). This permits a shorter and, on the whole, faster transmission of signals and information so that, in comparison to the described indirect further development, bus- or architecture-specific latency periods can clearly be reduced. An even faster and more reliable definition of the fallback level of the fuel pump can therefore take place, still before the fuel lines or communication connections are damaged.

According to a further embodiment, the communication-related connection between the crash recognition device and the electronic fuel pump can be constructed in a unidirectional and/or bidirectional fashion.

In the case of a unidirectional connection, an exchange of signals and information takes place in only one direction, preferably from the crash recognition device to the fuel pump. However, as an alternative or in addition, a bidirectional connection can also be provided. This permits a communication in both directions; thus, from the crash recognition device to the fuel pump and in the opposite direction. This has the additional advantage that a quality and an availability of the communication-related connection can be ensured and monitored. Both embodiments of the communication-related connection can be used for an indirect as well as for the direct connection.

As also described above, sensors are used for the recognition of a possible crash situation. For this purpose, the crash recognition device is connected with respect to communication with sensors for recognizing the crash situation. For this purpose, the crash recognition device may have its own sensors or use corresponding sensors of the vehicle in order to implement the described process.

Other objects, advantages and novel features of the present invention will become apparent from the following detailed description of one or more preferred embodiments when considered in conjunction with the accompanying drawings

DETAILED DESCRIPTION OF THE DRAWINGS

Figure 1:
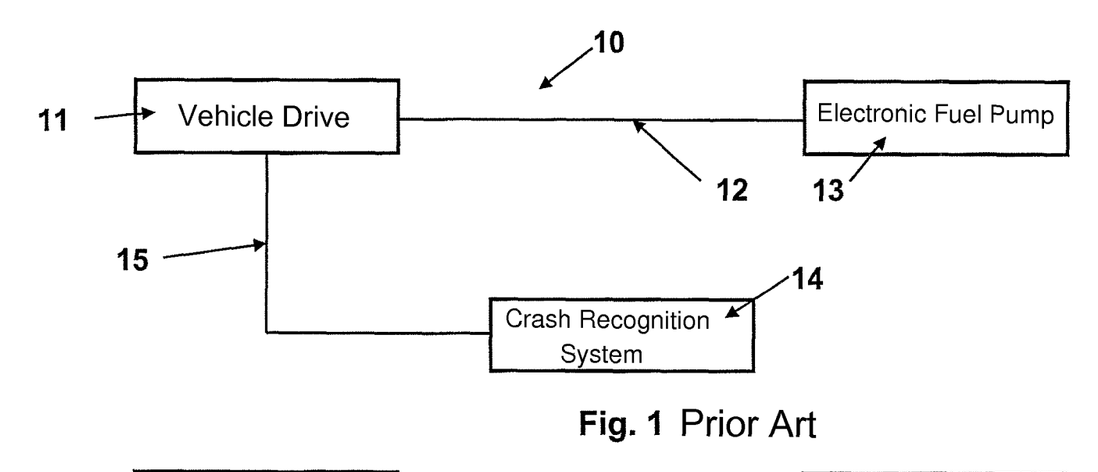
FIG. 1 is a view of a first embodiment of an arrangement of a crash recognition system known from prior art.

FIG. 1 illustrates a first embodiment of an arrangement 10 of a crash recognition system known from the prior art. This arrangement 10 includes a vehicle drive 11, which, relative to communication, is connected by way of a BUS system 12 with an electronic fuel pump 13. By way of this connection, information concerning a current fuel volume demand is usually sent, so that the fuel pump can be controlled correspondingly. Furthermore, a crash recognition system 14 is coupled with the vehicle drive 11 by way of a further connection 15. This further connection 15 may also be part of the BUS system 12 or of a second BUS system, and is used for transmitting signals of the crash recognition system 14 to the vehicle drive 11. In this manner, a signal concerning a recognized crash of the vehicle can be transmitted to the vehicle drive 11 and the latter can be switched off in response thereto. Furthermore, a signal for switching off the fuel pump 13 is usually sent from the vehicle drive 11 to the fuel pump 13.

Figure 2:
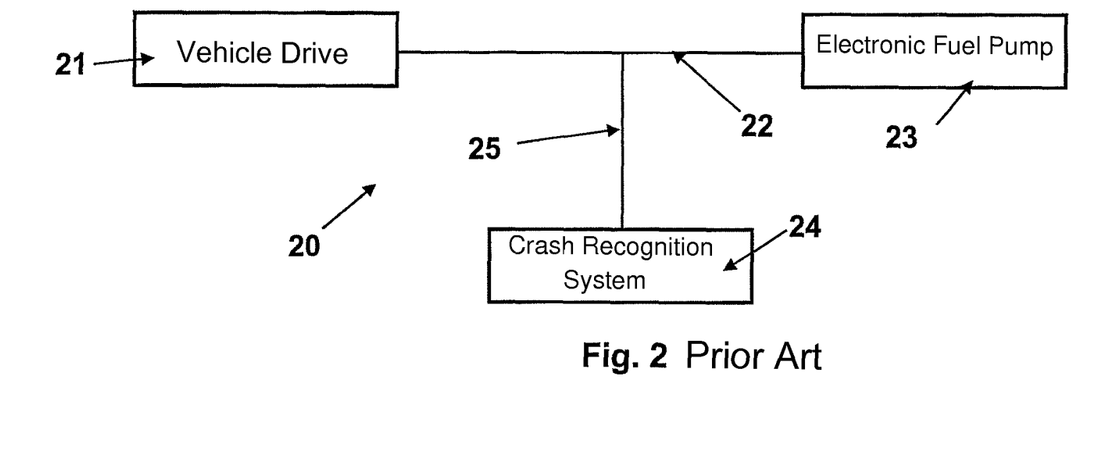
FIG. 2 is a view of a second embodiment of an arrangement of a crash recognition system known from prior art.

FIG. 2 illustrates a second embodiment of an arrangement 20 of a crash recognition system known from prior art. Corresponding to the arrangement of FIG. 1, this crash recognition system includes a vehicle drive 21 and an electronic fuel pump 23 connected with respect to communication by way of a BUS system. In contrast to the embodiment described in FIG. 1, a crash recognition system 24 is coupled directly with the BUS system 22, so that the crash recognition system 24 can send signals concerning a crash directly to the fuel pump 23 for the switch-off and likewise directly to the vehicle drive 21.

In both arrangements 10 and 20, according to the prior art, first, an actual recognition of an actually existing crash of the vehicle is assumed. This recognition of a crash usually represents no simple binary decision. On the contrary, stresses and decelerations only build up over time. This has the result, that a crash recognition takes place only in the course of an already occurring vehicle deformation. However, there is the danger in this case that the vehicle drive 11 or the BUS system 12, 22 are already damaged such that a transmission of a signal for the crash-caused switching-off of the fuel pump 13, 23 becomes impossible. In this case, the fuel pump 13, 23 notices nothing relating to the crash and remains in operation. On the contrary, the fuel pump recognizes an absence of information concerning a current fuel demand and therefore uses a delivery volume value defined as a fallback level, which is provided for a failure of the connection to the vehicle drive but is not designed for a crash case. This has the result that the fuel pump is not switched off in the case of a crash but delivers fuel corresponding to the delivery volume value, which significantly increases the risk of fire at the accident site.

Figure 3:
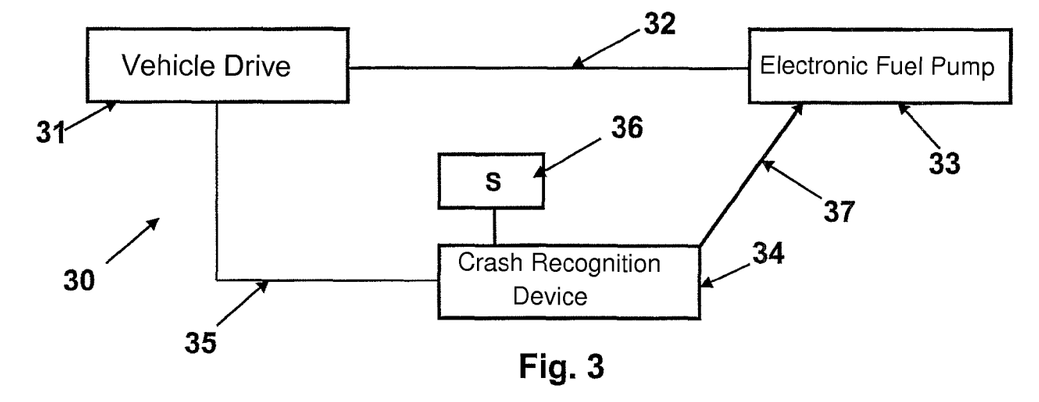
FIG. 3 is a view of a first embodiment of an arrangement of a crash recognition device according to the invention.

FIG. 3 illustrates a first embodiment of an arrangement 30 of a crash recognition device 34 according to the invention. Corresponding to the state of the art according to FIG. 1, this crash recognition device 34 is connected by way of a vehicle drive 31 by a BUS system 32 or a further BUS system 35 with respect to communication with an electronic fuel pump 33.

In contrast to the state of the art, however, a crash recognition device 34 according to the invention, is configured such that it deviates from that of a known crash recognition system 14, 24. By way of sensors 36 connected with respect to communication, the crash recognition device 34 can "anticipate" a possible crash already before a recognition of an actual crash, or at least notice it so early that a corresponding signal can already be sent to the fuel pump 33 and can be received there before a crash-caused destruction can interrupt a connection to the fuel pump. An additional difference consists of the fact that the corresponding signal does not cause a direct switching-off of the fuel pump. Rather, as a result of the signal, a delivery volume value of a fallback level of the fuel pump is defined as desired. Information concerning a precise sequence of the basic process is illustrated in a flow chart in FIG. 7.

In order to provide a faster connection to the fuel pump 33, the crash recognition device 34 can optionally be directly connected with the fuel pump by way of a connection 37, so that the signal can directly and rapidly reach the fuel pump 33.

Figure 4:
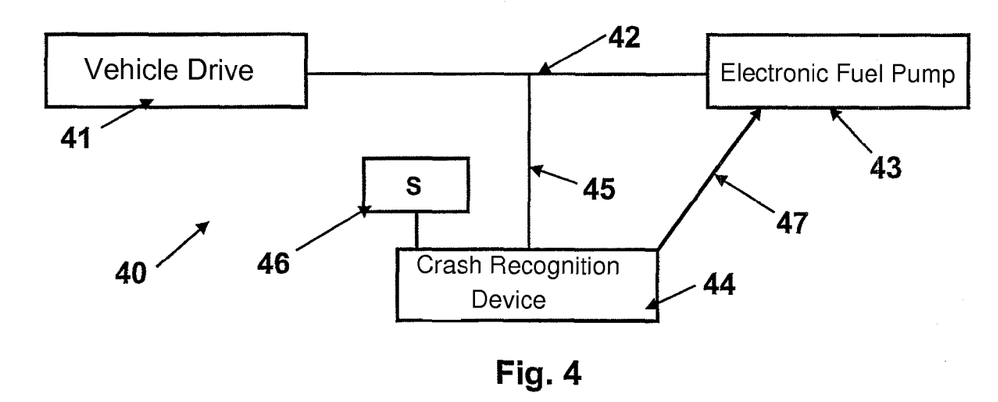
FIG. 4 is a view of a second embodiment of an arrangement of a crash recognition device according to the invention.

FIG. 4 illustrates a second embodiment of an arrangement 40 of a crash recognition device 40 according to the invention. The latter is particularly distinguished by a direct linking 45 of the crash recognition device 44 to a BUS system 42, which connects a vehicle drive 41 with an electronic fuel pump 43. Analogous to the arrangement 30 of FIG. 3, the crash recognition device 44 is connected with sensors 46 of the vehicle for recognizing a possible crash situation and is connected with the fuel pump 43 by way of a direct connection 47.

Figure 5:
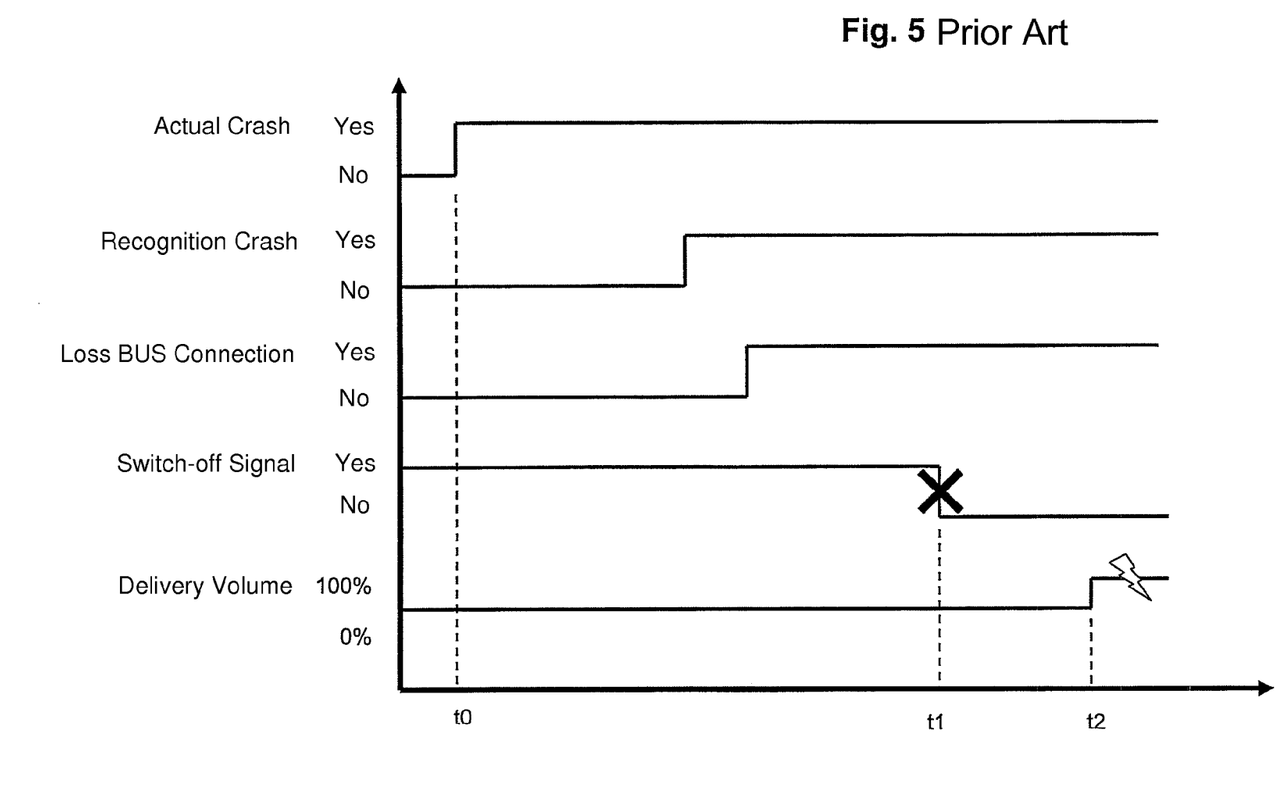
FIG. 5 is view of a flow chart for activating a fuel pump according to the prior art.

FIG. 5 illustrates a flow chart for activating a fuel pump according to the prior art. Accordingly, an actual physical crash is taking place at a point in time t0. Subsequently, a recognition of the crash takes place with some delay with a loss of a BUS connection of the electronic fuel pump, which takes place shortly afterwards. This has the result that a signal for switching off the electronic fuel pump, is sent out in response to the crash recognition shortly afterwards, but, as a result of the loss of the BUS connection, this signal cannot be received by the fuel pump. Instead, the fuel pump recognizes that a signal for determining a current delivery volume is no longer provided (t1), so that a delivery volume value stored in the fuel pump is used as the fallback level (t2). In the illustrated embodiment, the delivery volume is increased from an operating state (delivery volume between 0 and 100% of the fuel demand) to a maximal delivery volume (100% of the demand) in order to prevent an unintended failure of the vehicle. However, in the case of a crash with a leak, this leads to an intensification of a dangerous situation and to an acute fire hazard.

Figure 6:
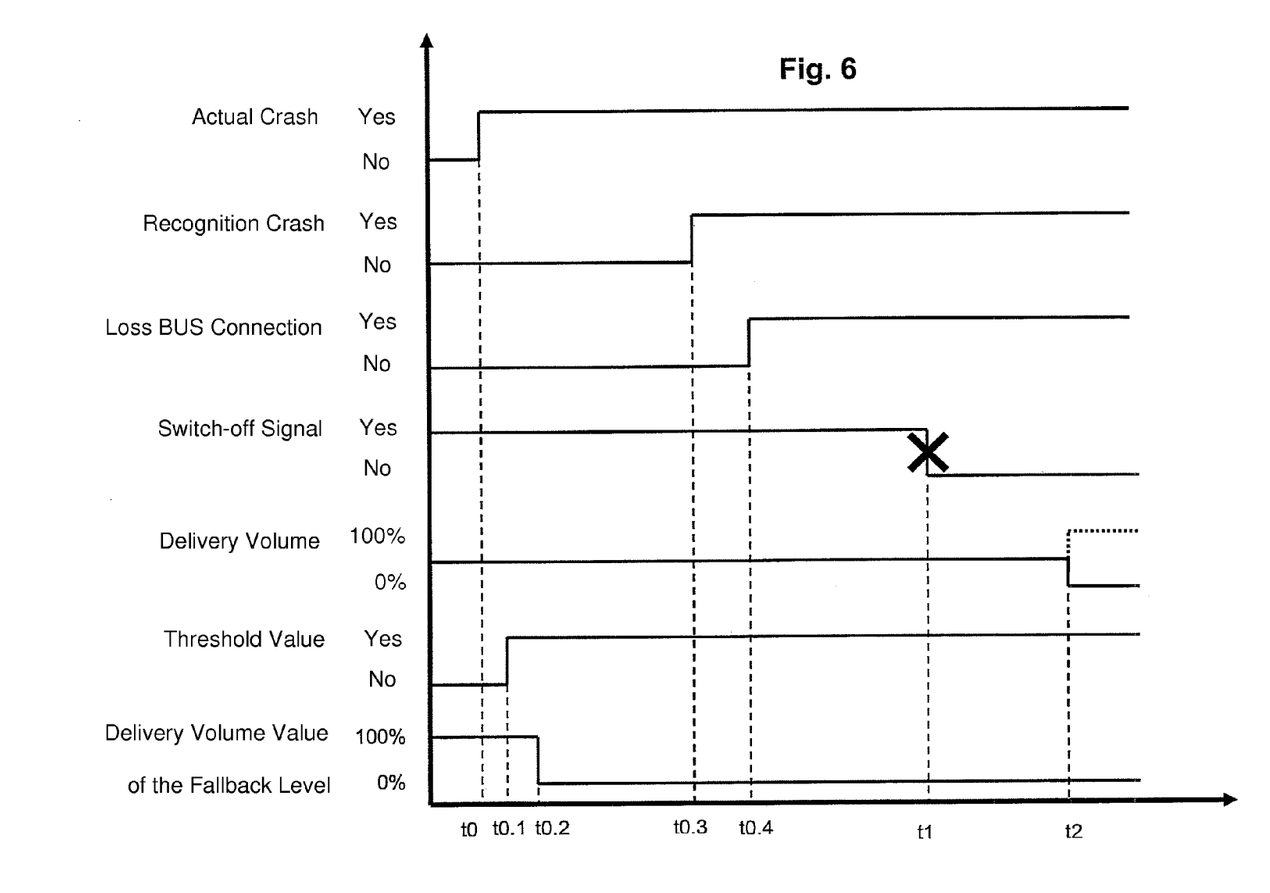
FIG. 6 is a view of a flow chart for activating a fuel pump according to the invention.

FIG. 6 illustrates a flow chart for an activation of a fuel pump according to the invention. Correspondingly, an actual crash also takes place here at a point in time t0. This has the result that, already after a short time, a sensor senses an acceleration (0.1) which exceeds a defined threshold value. In response to this measured value, a fallback level of the electronic fuel pump is defined immediately afterwards (t0.2). A delivery volume value stored there is reduced from the original 100% (for maximal protection against vehicle failure) to 0%.

A subsequent crash recognition (t0.3) and a loss of the BUS connection (t0.4) to the fuel pump remain without negative consequences because a definition of the fallback level has already taken place. A switch-off signal to the fuel pump, because of the lost BUS connection, is also not received by the fuel pump (t1). Subsequently, as a result of an absence of new delivery volume values, the fuel pump uses the delivery volume value defined at the fallback level and correspondingly sets the actual delivery volume back to 0% (t2), which de facto equals a switching-off of the fuel pump and reduces a fire hazard.

Only for the purpose of a comparison, the course of the delivery volume is outlined by a broken line for the case illustrated in FIG. 5 without a preconditioning according to the invention by defining the fallback level. To the contrary, as described in FIG. 5, this would increase the delivery volume and promote a fire hazard.

Figure 7:
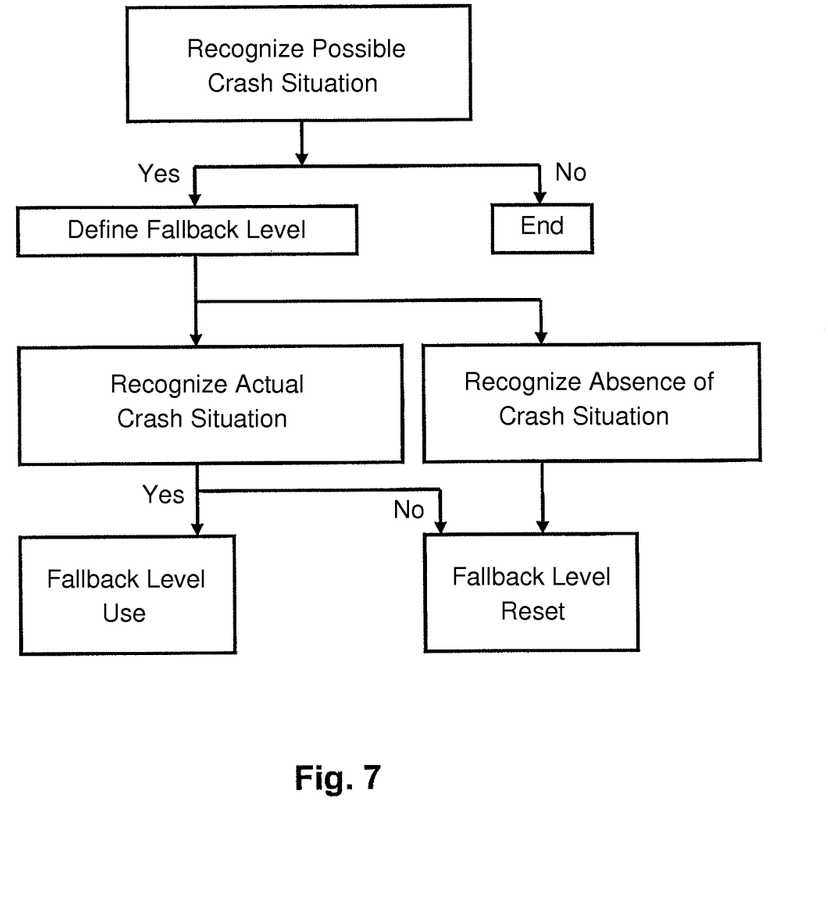
FIG. 7 is a view of a flow chart for activating a fuel pump according to the invention.

FIG. 7 illustrates a flow chart for a first embodiment of an activation process for a fuel pump according to the invention. The process includes a recognition of a possible crash situation. The recognition step may, in particular, have one of the substeps, which are not shown, of acquiring sensor data, evaluating sensor data, particularly the acquired sensor data, a comparison of the acquired and/or evaluated sensor data, and the computing of a probability on the basis of the sensor data as well as a subsequent decision step. When it is recognized that a possible crash situation is present, a defining of a fallback level of the fuel pump will follow by storing a delivery volume value, the stored delivery volume value being assigned to a closing position of the fuel pump.

Subsequently, by recognizing an actual crash situation, it is determined that, in fact, a crash has occurred, the fallback level or the stored delivery volume value is used and the corresponding delivery volume is adjusted. Because of the assignment to the closing position, the fuel pump is therefore closed and an operation is de facto terminated.

When, in contrast, no actual crash situation is recognized, the fallback level is reset again. This means that the stored delivery volume value is replaced by a second delivery volume value, which is assigned to an opened position of the fuel pump and describes a defined operating state with a certain delivery volume in order to ensure a failure safety of the vehicle. A decision that no recognition of a crash is present can take place, for example, after an eventless expiration of a predefined time period.

As an alternative or in addition, a step of recognizing an absence of a crash situation may be present. This may, for example, be so when an operation or an operating condition of the vehicle is recognized which would typically not be possible after an actual crash. Also in this case, the fallback level is correspondingly reset.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for activating a fuel pump having a definable fallback level for a delivery volume of the fuel pump, the process comprising the acts of:
   recognizing a possible crash situation;
   defining a fallback level as a first delivery volume value, which is assigned to a closing position of the fuel pump, in response to the recognizing of the possible crash situation; and
   recognizing an actual crash situation, wherein the step of the defining the fallback level occurs before the step of recognizing the actual crash situation.

2. The process according to claim 1, further comprising the act of:
   using the first delivery volume value defined as the fallback level for the closing position of the fuel pump in response to the recognizing of the actual crash situation.

3. The process according the claim 1, further comprising the acts of:
   recognizing an absence of a crash situation after an expiration of a defined time interval following the recognizing of the possible crash situation; and
   defining the fallback level to be a second delivery volume value, which is assigned to an opening position of the fuel pump, in response to the recognizing of the absence of the crash situation after the expiration of the defined time interval.

4. The process according to claim 3, further comprising the acts of:
   recognizing an absence of a crash situation via an evaluation of sensor data; and
   defining the fallback level to be a second delivery volume value, which is assigned to an opening position of the fuel pump, in response to the recognizing of the absence of the crash situation via the evaluation of the sensor data.

5. The process according to claim 4, wherein the act of recognizing the possible crash situation comprises one or more of the following acts:
   acquiring sensor data,
   evaluating the acquired sensor data,
   comparing the acquired or evaluated sensor data with predefined threshold values,
   computing a probability of the possible crash situation via the acquired or evaluated sensor data, or
   making a decision about a presence of the possible crash situation.

6. The process according to claim 1, further comprising the acts of:
   recognizing an absence of a crash situation via an evaluation of sensor data; and
   defining the fallback level to be a second delivery volume value, which is assigned to an opening position of the fuel pump, in response to the recognizing of the absence of the crash situation via the evaluation of the sensor data.

7. The process according to claim 1, wherein the act of recognizing the possible crash situation comprises one or more of the following acts:
   acquiring sensor data,
   evaluating the acquired sensor data,
   comparing the acquired or evaluated sensor data with predefined threshold values,
   computing a probability of the possible crash situation via the acquired or evaluated sensor data, or
   making a decision about a presence of the possible crash situation.

8. An electronic fuel pump control system, comprising:
   a crash recognition device;
   an electronic fuel pump having a definable fallback level as a first delivery volume value, the crash recognition device being communicatively coupled with the electronic fuel pump, wherein
   the crash recognition device comprises a microprocessor and a non-transitory computer readable medium having stored therein program code segments that:
   (i) recognize a possible crash situation;
   (ii) define a fallback level as a first delivery volume value, which is assigned to a closing position of the fuel pump, in response to the recognizing of the possible crash situation; and
   (iii) recognize an actual crash situation, wherein the fallback level is defined before the actual crash situation is recognized.

9. The control system according to claim 8, wherein the crash recognition device and the electronic fuel pump are directly connected with one another with respect to communication.

10. The control system according to claim 8, wherein the crash recognition device and the electronic fuel pump are indirectly connected with one another with respect to communication.

11. The control system according to claim 8, wherein the crash recognition device and the electronic fuel pump are both directly and indirectly connected with one another with respect to communication.

12. The control system according to claim 11 further comprising:
   sensors coupled with the crash recognition device, said sensors being configured for recognizing a crash situation.

13. The control system according to claim 8, wherein the communicative coupling between the crash recognition device and the electronic fuel pump is unidirectional.

14. The control system according to claim 8, wherein the communicative coupling between the crash recognition device and the electronic fuel pump is bidirectional.

15. The control system according to claim 8, wherein the communicative coupling between the crash recognition device and electronic fuel pump includes a unidirectional and a bidirectional coupling.

16. The control system according to claim 15, further comprising:
   sensors coupled with the crash recognition device, said sensors being configured for recognizing a crash situation.

17. The control system according to claim 8, further comprising:
   sensors coupled with the crash recognition device, said sensors being configured for recognizing a crash situation.

* * * * *